(12) United States Patent
Bierschwale

(10) Patent No.: US 8,498,938 B1
(45) Date of Patent: Jul. 30, 2013

(54) RETROACTIVE CREDITING OF ACCOUNTS WITH REMOTE ACTIVITY

(75) Inventor: Quentin A. Bierschwale, Lakehills, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 233 days.

(21) Appl. No.: 12/813,241

(22) Filed: Jun. 10, 2010

(51) Int. Cl.
*G06Q 40/00* (2012.01)

(52) U.S. Cl.
USPC .............. 705/42; 705/44; 705/35; 705/38; 705/1.1

(58) Field of Classification Search
USPC ....... 705/1.1, 42, 44, 35, 38, 45, 78; 235/380, 235/379; 714/15, 14.28, 14.17
See application file for complete search history.

(56) References Cited

U.S. PATENT DOCUMENTS

| | | | |
|---|---|---|---|
| 7,349,871 B2 | 3/2008 | Labrou et al. | |
| 7,617,156 B1 * | 11/2009 | Wolfson | 705/42 |
| 2005/0097046 A1 * | 5/2005 | Singfield | 705/42 |
| 2006/0144925 A1 | 7/2006 | Jones | |
| 2008/0010204 A1 * | 1/2008 | Rackley, III et al. | 705/45 |

OTHER PUBLICATIONS

Key Pousttchi & Martin Schurig,—"Assessment of Today's Mobile Banking Applications from the View of Customer Requirements" [Retrieved on Feb. 16, 2010], Retrieved from the internet<http://portal.acm.org/citation.cfm?id=963161>.*
"Assessment of Today's Mobile Banking Applications from the View of Customer Requirements" [Retrieved on Feb. 16, 2010], Retrieved from the internet <http://portal.acm.org/citation.cfm?id=963161>.
"Security of Mobile Banking" [Retrieved on Feb. 16, 2010], Retrieved from the internet <http://pubs.cs.uct.ac.za/archive/00000347/01/Security_of_Mobile_Banking_paper.pdf>.

* cited by examiner

*Primary Examiner* — John H Holly
(74) *Attorney, Agent, or Firm* — Perkins Coie LLP

(57) ABSTRACT

Methods, devices, and apparatuses are described for retroactively applying financial activity recorded at an electronic device temporarily disconnected from a network to an account. This may include a customer providing financial transaction information, wherein the financial transaction information comprises funds to be credited to or debited from the account. After a period of time, it may be determined that a previously unavailable network connection to the host computer system is available. The financial transaction information and a timestamp indicating when the financial transaction information was received at the electronic device may then be transmitted. The financial transaction may then be applied to the account retroactively at a time linked to the timestamp.

20 Claims, 5 Drawing Sheets

RETROACTIVE CREDITING OF ACCOUNTS WITH REMOTE ACTIVITY

BACKGROUND OF THE INVENTION

Over the past decade, electronic banking has increasingly been adopted by consumers as a replacement and/or supplement to visiting their banks' branches. Services offered to banking customers electronically, typically via a computer (e.g., a computer at home or work, public terminal, kiosk, etc.) or mobile device (e.g., a cellular phone, smart phone, tablet computer, laptop, netbook, etc.) used in conjunction with the Internet, include functionality such as the ability to manage funds, transfer funds, buy and sell securities, pay bills (in the form of one-time payments and automatic recurring payments), and check account activity.

BRIEF SUMMARY OF THE INVENTION

In some embodiments, a method for retroactively crediting an account with financial activity recorded at an electronic device temporarily disconnected from a network is described. The method may include receiving a set of financial data, wherein the set of financial data comprises an amount of funds to be credited to the account. The method may also include determining a network connection to a host computer system is unavailable. The method may include storing the set of financial data at least until the network connection to the host computer system is available. Further, the method may include, after a period of time, determining the network connection to the host computer system is available. The method may include transmitting the set of financial data and a timestamp indicating when the set of financial data was received at the electronic device. The method may include receiving the set of financial data and the timestamp. The method may also include determining the set of financial data is eligible for retroactive crediting to the account. Moreover, the method may include retroactively crediting the account with the amount of funds at a time linked to the timestamp. Also, the method may include adjusting a credit or debit of the account based on the retroactive crediting of the account with the amount of funds. The method may also include transmitting a confirmation indicating that the funds have been retroactively credited to the account. Such a confirmation may be received by an electronic device.

In some embodiments, a computer-readable medium of a host computer system comprising instructions, which, when executed by a processor, cause the processor to retroactively credit an account with financial activity recorded at an electronic device temporarily disconnected from a network is described. The instructions include receiving a set of financial data wherein the financial data comprise an account identifier, an amount of funds to be credited to an account linked to the account identifier, and a timestamp. The instructions further include determining, at least partially based on the financial data, that the funds are eligible to be retroactively credited to the account identified by the account identifier. The instructions further comprise retroactively crediting the account identified by the account identifier with the amount of funds. The instructions further include adjusting credits, a balance of the account based on the retroactive crediting of the account with the amount of funds.

In some embodiments, prior to receiving the set of financial data, the remote electronic device is disconnected from a network and thereby unable to communicate with the host computer system for a period of time. Also, in some embodiments, at least a portion of the set of financial data is received from a customer at the remote electronic device while the remote electronic device was disconnected from the network.

In some embodiments, an apparatus for retroactively crediting an account with a deposit is described. The method may include a remote electronic device, wherein the remote electronic device is configured to: receive deposit information from a customer, wherein the deposit includes an account number and an amount of funds; determine a network connection to a host computer system is unavailable; store the set of financial data at least until the network connection to the host computer system is available; after a period of time, determine the network connection to the host computer system is available; and transmit to the host computer system the set of financial data and a timestamp indicating when the set of financial data was received at the electronic device. The method may also include a banking host computer system, wherein the banking host computer system is configured to: receive the set of financial data and the timestamp; determine the set of financial data is eligible for retroactive crediting to the account; retroactively credit the account with the amount of funds at a time linked to the timestamp; and adjust a credit or debit of the account based on the retroactive crediting of the account with the amount of funds.

In some embodiments, the electronic device comprises a clock used to create the timestamp configured to synchronize the clock with a time and a date received at the electronic device from the network, wherein the synchronization occurs prior to receiving the set of financial data at the electronic device during a time when the network was available. Also, in some embodiments, the adjustment of the balance of the account comprises eliminating a debit of an overdraft fee that is no longer applicable following the retroactive crediting of the amount of funds to the account. The remote electronic device may be a cellular phone and the network may be a cellular service provider's network. In some embodiments, the remote electronic device may be a computer system and the network may be the Internet.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION OF THE INVENTION

Figure 1:
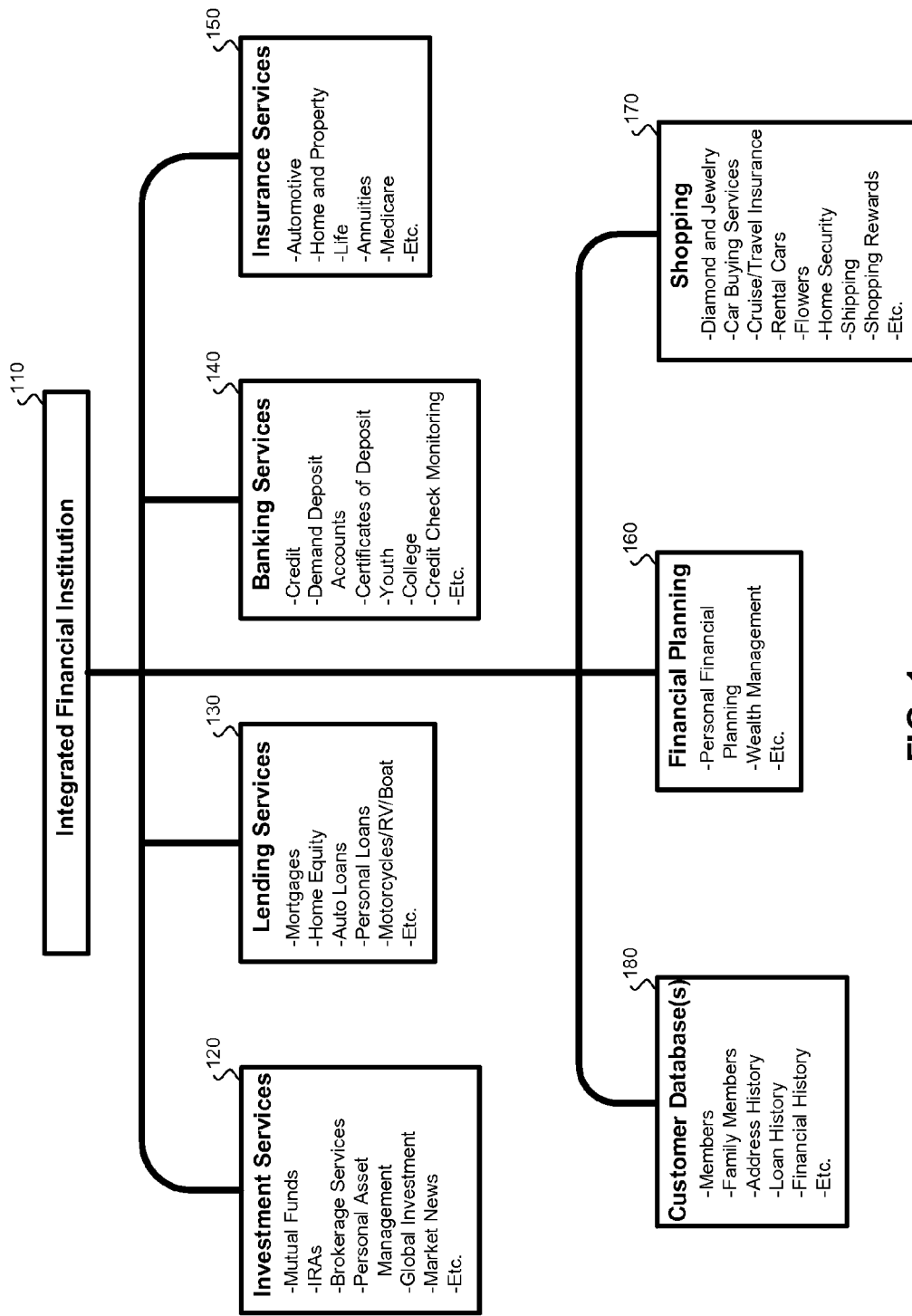
FIG. 1 illustrates a simplified block diagram of an embodiment of an integrated financial institution.

An integrated financial institution may provide a variety of banking, investment, and related services to consumers. FIG. 1 illustrates a simplified block diagram of an embodiment 100 of an integrated financial institution 110 and some of the various business areas it may provide services to consumers in. Integrated financial institution 110 may offer a variety of such services to consumers. Integrated financial institution 110 may offer services such as: investment services 120, lending services 130, banking services 140, insurance services 150, financial planning 160, and shopping services 170. Each of these business areas of integrated financial institution 110 may have access to one or more customer databases 180.

Integrated financial institution 110 may offer customers various investment services 120. These investment services 120 may include such services as: 1) the ability to trade mutual funds; 2) advice and assistance in establishing individual retirement accounts (IRAs); 3) brokerage services (e.g., stock and exchange-traded fund trading services); 4) personal asset management; 5) global investment strategy and market access; and 6) access to up-to-date market news and analysis. Such investment services 120 are only examples of the investment services an integrated financial institution 110 may offer; other services may be possible.

Integrated financial institution 110 may also offer customers various lending services 130. These lending services 130 may include services such as: 1) mortgages; 2) home equity loans; 3) automotive loans; 4) personal loans; and 5) motorcycle loans/recreational vehicle (RV) loans/boat loans. Such lending services 130 are only examples of the lending services an integrated financial institution 110 may offer; other services may be possible.

Further, integrated financial institution 110 may offer customer various banking services 140. These banking services 140 may include services such as: 1) credit (e.g., credit cards and associated accounts); 2) demand deposit accounts (e.g., checking accounts, savings accounts, these accounts may be linked to one or more debit cards); 3) certificates of deposit (CDs), possibly for multiple different lengths of time; 4) youth programs (e.g., savings accounts to teach children the benefits of savings, prepaid cards); 5) college programs (e.g., prepaid cards, checking accounts, spending-limited credit cards); and 6) credit check monitoring (e.g., alerts may be sent to a consumer to signal negative credit activity on the consumer's credit report). Such banking services 140 are only examples of the banking services an integrated financial institution 110 may offer; other services may be possible.

Integrated financial institution 110 may offer customers various insurance services 150. These insurance services 150 may include services such as: 1) automotive insurance; 2) home and/or property insurance; 3) life insurance; 4) annuities; and 5) Medicare-related services (e.g., supplemental insurance, prescription drug plans). Such insurance services 150 are only examples of the insurance services an integrated financial institution 110 may offer; other services may be possible.

Integrated financial institution 110 may offer customers various financial planning services 160. These financial planning services 160 may include services such as: 1) personal financial planning; and 2) wealth management. Such financial planning services 160 are only examples of the financial planning services an integrated financial institution 110 may offer; other services may be available.

Integrated financial institution 110 may offer customers still other services, such as shopping services 170. Shopping services 170 may include offers with third-party vendors that integrated financial institution 110 has secured agreements with. These shopping services 170 may include services such as: 1) diamond and jewelry purchasing (possibly directly from integrated financial institution 110); 2) car buying services; 3) cruise/travel insurance; 4) vehicle renting; 5) flower purchase discounts, 6) home security discounts; 7) shipping discounts; and 8) shopping rewards programs. Such shopping services 170 are only examples of the shopping services an integrated financial institution 110 may offer; other services may be possible.

Integrated financial institution 110 may maintain one or more customer databases 180 about its customers (also referred to as members). Customer databases 180 may contain current and historical information about the members of integrated financial institution 110. For example, information that is retained in customer databases 180 may include: a listing of current members/customers and their personal information (e.g., contact information, job history, etc.), family members of the customers, historical addresses for customers, historical loan information for customers, and the customer's financial history. Various pieces of this information stored in the one or more customer databases 180 may be accessible to various departments of integrated financial institution 110 and/or directly to members.

As those with skill in the art will recognize, while integrated financial institution 110 may divide its services into various departments or business areas as depicted in FIG. 1, the various services depicted as grouped are for representation purposes only, and are not intended to be limiting as to how integrated financial institution 110 may be organized.

Figure 2:
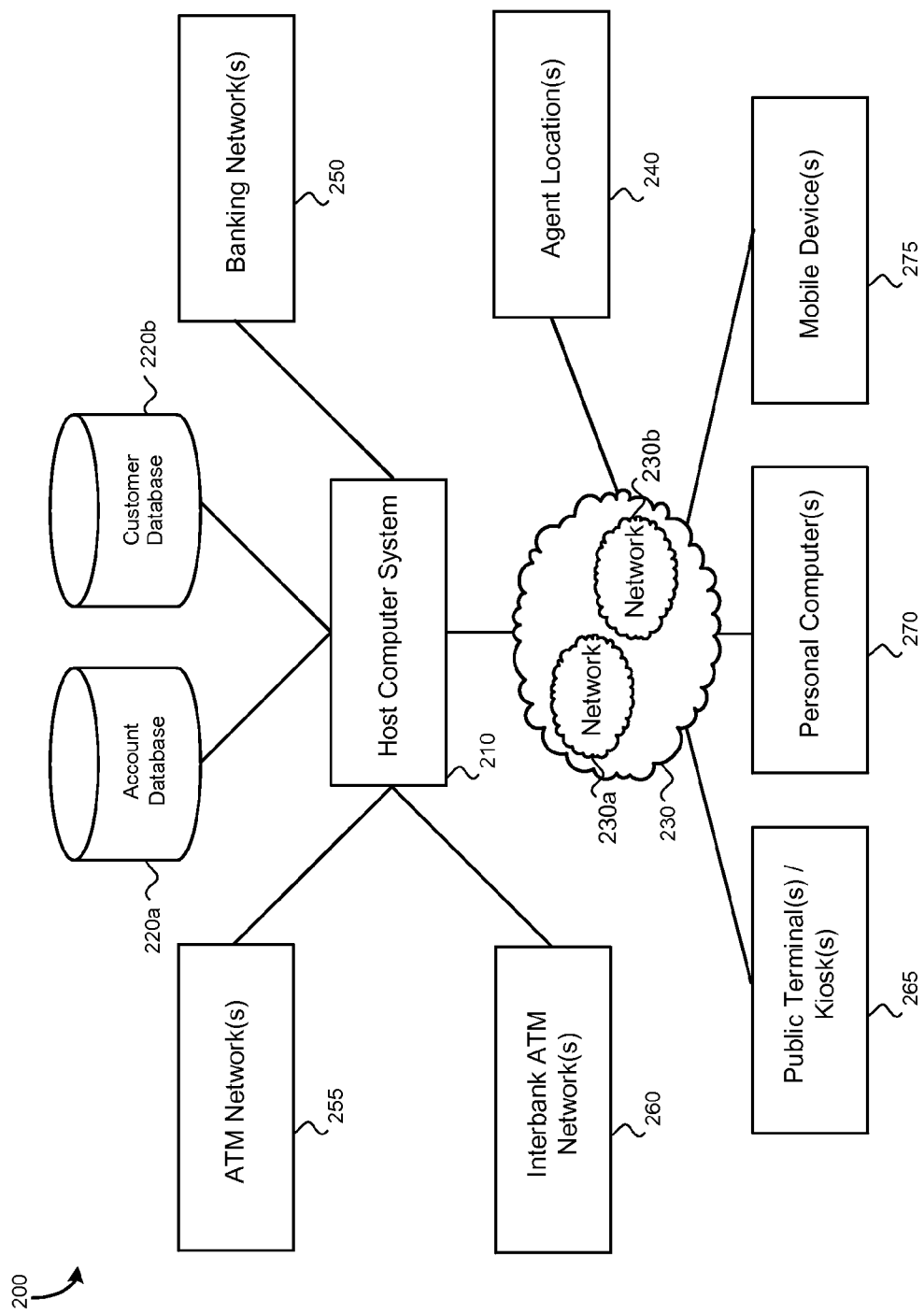
FIG. 2 illustrates a simplified block diagram of an embodiment of a system configured to provide consumers with financial services, such as those described in relation to FIG. 1.

Integrated financial institution 110 may use a variety of different hardware and software architectures to provide some or all of the services of FIG. 1 to consumers. FIG. 2 illustrates a simplified block diagram of an embodiment of a system 200 configured to provide consumers with financial services, such as those described in relation to FIG. 1 and/or additional services. Such a system 200 may include: a host computer system 210, any number of databases 220, any number of networks 230, any number of agent locations 240, any number of banking networks 250, any number of automated teller machine (ATM) networks 255, any number of interbank ATM networks 260, any number of public terminals and/or kiosks 265, any number of personal computers 270, and any number of mobile devices 275.

Host computer system 210 may include any number of computers and/or servers. Such computers and/or servers are detailed in FIG. 5. The host computer system may have access to any number of databases 220. Databases 220 are illustrated as two databases in system 200: account database 220a and customer database 220b. These databases may be part of, or separate from, the customer database 180 of FIG. 1. The host computer system may be able to access these (and other) databases for account information, customer information, and other stored information. As those with skill in the art will recognize, databases 220 may be multiple databases or a single database. Databases 220 may be local to host computer system 210 or may be remotely accessed via a public network (e.g., Internet) and/or private network (e.g., an intranet of the integrated financial institution 110).

Host computer system may interact with any number of agent locations 240. Such agent locations 240 may be branded branches of integrated financial institution 110 and/or may represent a third-party acting on the integrated financial institution's behalf, such as a cashier or clerk employed by a third-party that has an operating agreement with integrated financial institution 110. Agent locations 240 may interact with host computer system 210 via a network 230.

Agent locations 240 may have point-of-sale devices that an agent (or customer) uses to interact with host computer system 210. Network 230 may be a public or private network, or a combination of multiple networks. For example, the use of network 230 may involve the use of a cellular service provider's wireless network 230a and/or the Internet 230b. The networks 230a and 230b are merely examples of two networks that may be used for communication. Another example may be a private intranet. Host computer system 210 may also communicate with various other banking networks 250. For example, a banking network that computer system 210 may communicate with is any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE are also possible.

The host computer system may interact with one or more automated teller machine (ATM) networks 255. These ATM networks 255 may be maintained by the integrated financial institution 110. The host computer system 210 may also communicate with interbank ATM networks 260. These ATM networks may be maintained by entities distinct from integrated financial institution 110.

The host computer system 210 may also communicate with any number of public terminals/kiosks 265, personal computers 270, and mobile devices 275. Such systems may be used by a customer to communicate with host computer system 210. All of these systems may be located remote from host computer system 210 and communicate with host computer system 210 via network 230, which may be a combination of multiple different networks, such as networks 230a and 230b. Public terminals/kiosks 265 may be computers available to the public and/or specially designed kiosks that interact with host computer system 210. Personal computers 270 may be any computers (e.g., desktop computers, laptop computers, netbooks, tablet computers, Internet-enabled television devices, etc.) connected to the Internet. Mobile devices 275 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer.), tablet computers (a portable computer having a touch interface), netbooks, laptops possibly with a wireless connection (such as an 802.11a/b/g connection or mobile broadband connection, such as via a 3G or 4G wireless network). Such mobile devices 275 may run one or more applications designed to enable interaction with host computer system 210. Such applications may provide various banking functionality, including withdrawals, balance inquiries, deposits (such as via the transmission of a check image), transfers, etc.

While, ideally, the connections between public terminals/kiosks 265, personal computers 270, mobile devices 275 (all three collectively referred to as "remote devices") and the host computer system 210 are always possible, unexpected events and limited service areas may preclude this possibility. Networks, such as network 230, may occasionally be offline for maintenance, as are computer systems such as host computer system 210. A mobile network, such as network 230a, may be unavailable in areas due to no transmission towers being present, a power outage, physical damage to the network, too many customers attempting to connect to the network, etc. Further, a problem may exist with the host computer system 210. Whatever the reason, a connection from agent locations 240, public terminals/kiosks 265, personal computer 270, or mobile device 275 to host computer system 210 is not 100% reliable.

Therefore, if a connection to host computer system 210 is not always available, there may be times a customer wishes to conduct banking functions with host computer system 210, but is unable to do so. This may be especially troublesome to the customer if the banking transaction is time sensitive. For example, a customer may wish to deposit a check today so that his checking account will have enough funds for an automated mortgage withdrawal scheduled tomorrow. Without the funds being deposited prior to the automated mortgage withdrawal occurring, the consumer may be charged a fee, such as an overdraft fee, for withdrawing funds from his account in excess of the balance. In such a situation, the customer may attempt, but be unable to successfully communicate with the host computer system 210 to conduct the deposit transaction until after the withdrawal has taken place (and the overdraft fee has been applied to the account).

Methods and systems that allow financial activity to be retroactively posted to an account may prevent such a situation and/or similar situations from adversely affecting a customer. Continuing with the example, if the customer attempted to make a deposit from a remote device, but was unable to interact with the host computer system for whatever reason, the customer's attempt may be stored at the remote device and time stamped. At a later time, the connection between the remote device the consumer used to attempt the transaction and the host computer system may be re-established. Deposit information may then be transmitted to the host computer system, along with the time stamp indicating when the customer initially attempted to complete the deposit. If the deposit satisfies various conditions, the consumer may be retroactively credited with the deposit on the date and/or at the time he initially attempted the transaction. Such a retroactive crediting to an account may result in the customer having enough funds in his account such that an overdraft, or some other fee, is no longer applicable to the account. Therefore, the fee may be eliminated.

Besides the elimination of fees, such retroactive crediting to an account may be used to increase the amount of funds used to calculate interest due to an account holder. As those with skill in the art will recognize, other situations exist where the balance or status of an account may change based on a retroactive transaction (such as a deposit, a withdrawal or a transfer) being posted to an account.

Figure 3:
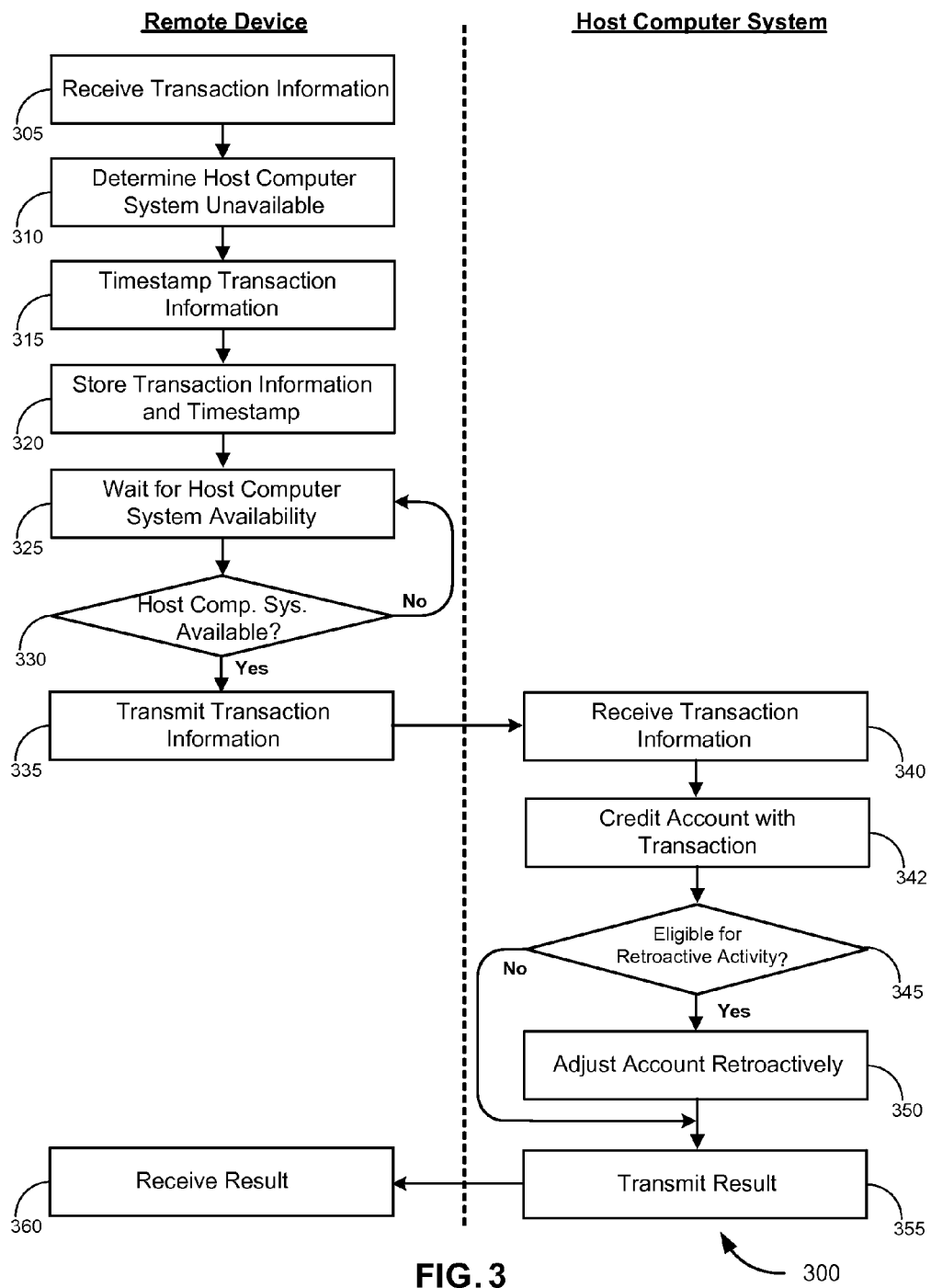
FIG. 3 illustrates an embodiment of a method for retroactively crediting a consumer for a transaction attempted earlier by the consumer, wherein the transaction could not be completed due to the inability of the customer to connect to the host computer system.

FIG. 3 illustrates an embodiment of a method 300 for retroactively crediting a consumer for a transaction attempted by the customer that was not completed due to the inability of the remote device used by the customer to connect to the host computer system. While the ensuing method relates to a deposit transaction, it should be understood that any number of different transactions may be completed using a similar method. For example, other transactions include withdrawal transactions, transfer transactions, credits and debits from credit card accounts, credits and debits from stored value accounts, and bill payment transactions. Such a method 300 may employ the systems, devices, and/or apparatuses discussed in relation to FIG. 2. Alternatively, the method may employ the use of different systems, devices, and/or apparatuses.

At block 305, transaction information may be received at the remote device from the customer. The remote device may be any device located remote from the host computer system. For example, referring to FIG. 2, the remote device may be a public terminal or kiosk 265, a personal computer 270, or mobile device 275. In some embodiments, the remote device may be a point-of-sale device located at an agent location, such as agent location 240. The transaction information received at the remote device may include information such as: the customer's name, a username, the customer's account number, a password, an amount of deposit (or withdrawal), an image of a negotiable instrument to be deposited, etc. As those with skill in the art will recognize, transaction information may include many other pieces of information that are pertinent to a banking transaction.

Once the transaction information has been successfully received at the remote device, the remote device may attempt to transmit some or all of the transaction information to the host computer system (such as host computer system 210 of FIG. 2). However, at block 310, the remote device may determine that the host computer system is unavailable. The host computer systems may be unavailable for any number of reasons. For example, the host computer system may be unavailable because the network connection between the remote device and the host computer system has failed. Or, the remote device may be located outside of the network coverage area. The unavailability of the connection may also be due to a problem with the host computer system or the remote device. Any number of other possible reasons may exist for why the remote device is unable to communicate with the host computer system.

After determining that the host computer system is unavailable (or, perhaps, before determining the host computer system is unavailable) the transaction information received at the remote device from the customer may be time stamped at block 315. The timestamp may indicate when the transaction information was initially received from the customer at the remote device or may indicate when the remote device attempted to transmit the transaction information to the host computer system but failed due to the host computer system being unavailable. The timestamp may include a date and/or a time. The time and/or date information used to create the timestamp may be based on a previous date and/or time received by the remote device from the host computer system or some other system via the network at a time when the host computer system and/or network was previously available. From this previous time, the remote device may maintain the current time using an internal clock. The customer does not have the ability to modify the time maintained by the remote device in order to prevent a transactions from fraudulently being stamped as recorded earlier or later than actually received at the remote device. In other embodiments, the customer may manually provide the remote device with the date and/or time.

At block 320, the transaction information, along with the timestamp, may be stored at the remote device. This information may be stored on any form of computer-readable medium at the remote device, such as memory, a hard drive, etc. The transaction and timestamp information may be stored at least until the information is successfully transmitted between the remote device and the host computer system.

At block 325, the remote device may wait a predetermined amount of time before attempting to retransmit the transaction information and timestamp to the host computer system. In some embodiments, the remote device may attempt to connect to the host computer system at least once a minute, once an hour, once every two hours, or once a day. In some embodiments, the customer must initiate the attempt at the remote device. At block 330, it may be determined whether the connection to the host computer system is available. If not, remote device may return to block 325 and wait some amount of time before attempting to connect to the host computer system again. However, at block 330, if the host computer system is determined to be available, the method may proceed to block 335.

This sequence of waiting and retrying to connect with the host computer system may involve polling. If the remote device is unable to connect with the host computer system because the network is unavailable, the remote device may periodically attempt to reconnect to the network. Such polling may also involve the remote device increasing the strength of its transmission signal in an attempt to contact the network. The remote device may also enter a dormant period to preserve battery life if the network is unable to be contacted. Periodically it may awake from the dormant period and reattempt to connect to the network and communicate with the host computer system.

At block 335, the transaction information initially attempted to be transmitted to the host computer system at block 310 may be transmitted to the host computer system from the remote device. At block 340, this transaction information (including the timestamp) may be received at the host computer system.

At block 342, the customer's account may be credited with the transaction. At block 345, it may be determined whether the transaction conducted by the customer is eligible for retroactive activity. Retroactive activity may include the account of the customer being credited with the transaction at the time the customer initially attempted to conduct the transaction at block 310.

Many factors may be used in determining whether the transaction is eligible for retroactive activity. For example, only certain types of transactions may be eligible for retroactive activity, such as deposits, but not withdrawals. Also, there may be a time restriction on how long of a period of time may lapse between when the customer initially attempted to transmit the transaction at block 310 and the time the transaction information was received by the host computer system at block 340. For example, the integrated financial institution operating the host computer system may not allow for retroactive activity to be posted to an account when more than one week has elapsed between the initial attempt to conduct the transaction and when the transaction information was received by the host computer system. In some embodiments, if the amount of time that has passed is greater than the maximum time period, the transaction may be posted the earliest the maximum time period allows. Another factor that may be considered when determining whether a transaction is eligible for retroactive activity is the amount of the transaction. For example, the integrated financial institution may not allow for transactions greater than $1000 to be eligible for a retroactive transaction. As those of skill in the art will recognize, the financial institution maintaining the host computer system may create any variety of different rules governing which transactions are eligible for retroactive activity and which are not.

If the transaction is determined to not be eligible for retroactivity at block 345, the transaction may still be credited to the account; however, the time and date the transaction is credited to the account may be the time and date the transaction was received at the host computer system. In some embodiments, if the transaction is not eligible for retroactive activity, the transaction will not be credited at all to the customer's account. If, at block 345, the transaction is determined to be eligible for retroactive activity, the method may proceed to block 350. At block 350, the customer's account may be adjusted retroactively. This may include the transaction being credited to the account as if it was completed at the time the customer initially tried to conduct the transaction at block 310 (e.g., the time indicated by the timestamp). This may also include adjusting subsequent transactions. For example, fees charged to the account due to overdrafts, and/or the interest credited to the account may need to be adjusted following the retroactive crediting of the transaction to the customer's account.

At block 355, whether the transaction was eligible for retroactive activity or not, the result may be transmitted from the host computer system to the remote device. This result may be a confirmation indicating that the transaction has been completed, that the transaction was retroactively credited to the customer's account. The transmitted result may also indicate that the transaction was credited to the customer's account; however; it was not eligible for retroactive activity. Or, if the transaction was refused for whatever reason, the result transmitted to the remote device may indicate as such.

At block 360, the result may be received by the remote device. The result transmitted at block 355 and received at block 360 may be in many different forms. For example, the result may be in the form of a text message, an e-mail, a notification received through an application present on the remote device, or any other suitable form of communication.

Figure 4:
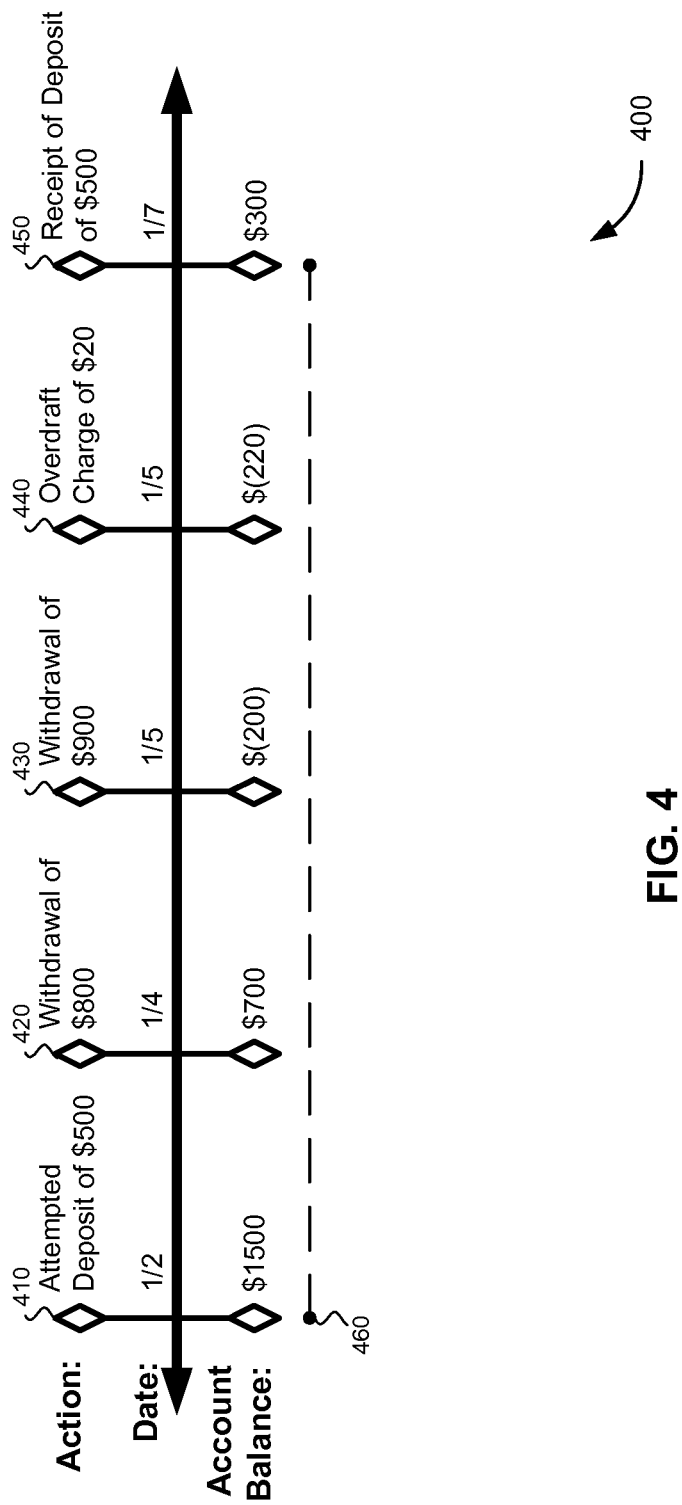
FIG. 4 illustrates an exemplary timeline of transactions where a retroactive transaction monetarily benefited the account holder.

FIG. 4 illustrates an exemplary timeline 400 of transactions where a retroactive transaction monetarily benefits the customer. The exemplary timeline 400 is merely an example and does not limit the invention in any way. Rather, it is intended to illustrate how the invention may function and benefit a customer. At time 410, on January 2nd, the consumer attempted to make a deposit of $500. For whatever reason, the remote device the consumer used to attempt the deposit was unable to successfully communicate with the host computer system. On this date, the customer's account balance was $1500 (not including the attempted deposit of $500). The customer may or may not have been aware that the attempted deposit of $500 failed.

At time 420, on January 4th, a withdrawal of $800 occurred from the customer's account. This withdrawal may have been made by the customer (possibly made in person at a bank branch, or remotely, such as via the Internet), or may have been some form of automatic payment, such as an automatic mortgage payment or some other bill payment transaction. Following this transaction, the account balance was $700 (again, not including the attempted deposit of $500 on January 2nd). On the next day, January 5, at time 430, another withdrawal occurred. This time, the amount withdrawn was $900. Again, the withdrawal may have been done by the customer, some other customer authorized on the account, or an automated withdrawal. This withdrawal brought the account balance to −$200. Because the account's balance became negative in the exemplary timeline 400, the financial institution holding the account assessed the customer's account an overdraft charge of $20 at time 440. Therefore, the balance on the customer's account became −$220. At time 450, on January 7th, the remote device at which the customer conducted the transaction was able to successfully transmit the transaction information to the host computer system. Time 460 illustrates the time period where the remote device was unable to communicate the transaction information to the host computer system. Assuming the deposit of the $500 is eligible to be treated as a retroactive transaction, the customer's account may be retroactively adjusted for the deposit of the $500 as if the deposit occurred on January 2nd. Therefore, the account balance on January 2nd would have been $2000. The subsequent withdrawals of $800 and $900 would have brought the account balance to $300 (as opposed to −$200). Therefore, when including the retroactive deposit, the account never had a negative balance, and, thus, the overdraft charge of $20 is not applicable. Therefore, on January 7th, the customer's account balance stands at $300 rather than $280 because the overdraft charge was eliminated following the retroactive deposit being posted to the account. Further, besides the elimination of the overdraft charge, the customer may be due additional interest on the funds held in the account (due to the increased balance following the posting of the retroactive deposit).

While the above example focuses on a customer conducting a deposit that is posted to an account retroactively, other forms of banking may similarly be used in such a retroactive fashion. For example, withdrawals may also be able to be posted to an account retroactively. Also, transfers to other accounts may be able to be posted retroactively.

Figure 5:
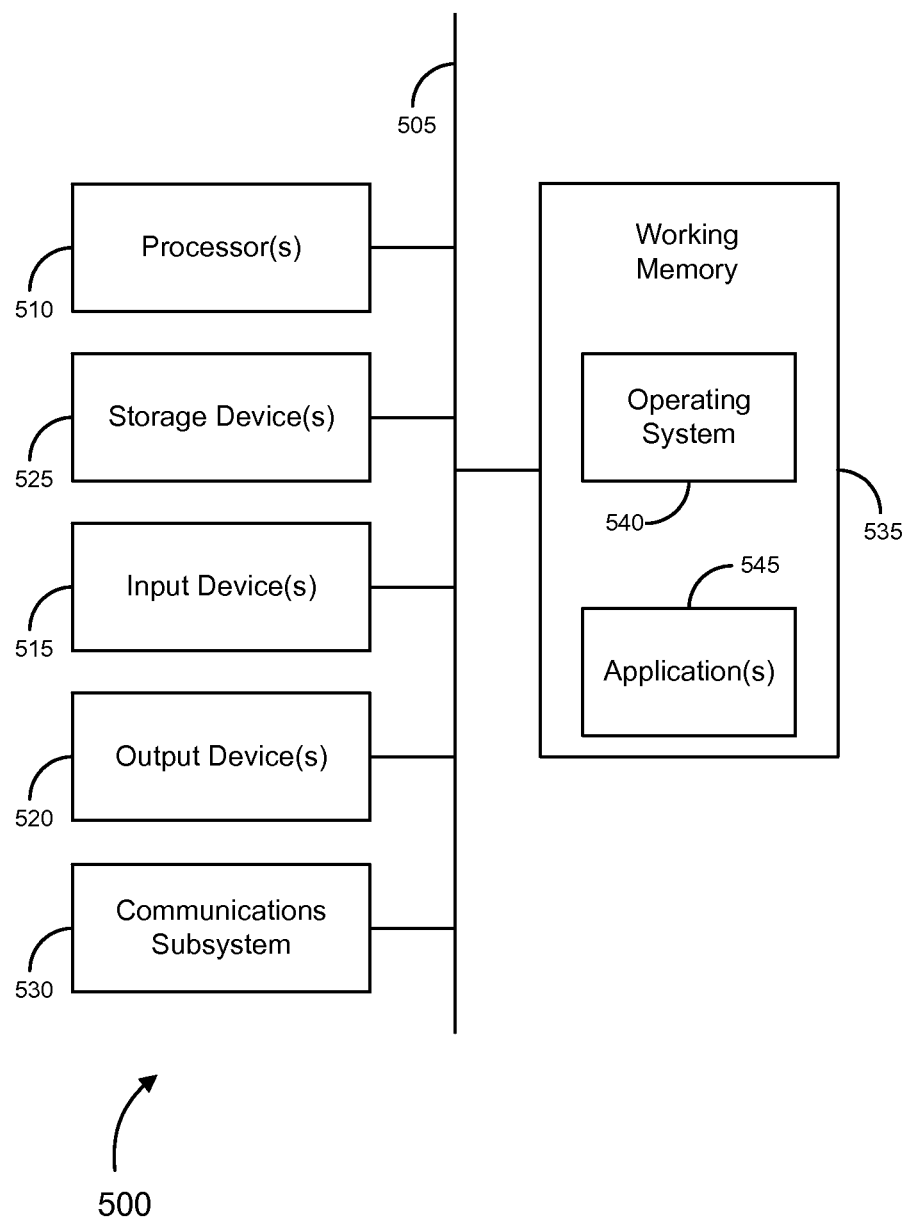
FIG. 5 illustrates a simplified block diagram of a computer system that may serve as any of the computing devices described herein.

To perform the actions of the host computer system, the remote device, or any of the other previously mentioned computing devices, may be used. A computer system as illustrated in FIG. 5 may be used. FIG. 5 provides a schematic illustration of one embodiment of a computer system 500 that can perform the methods provided by various other embodiments, as described herein, and/or can function as the host computer system, a remote kiosk/terminal, a point-of-sale device, a mobile device, and/or a computer system. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as the system 500. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor (s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for retroactively conducting a financial transaction linked to an account at an electronic device temporarily disconnected from a host computer system, the method comprising:
   receiving, by the electronic device, instructions to complete the financial transaction;
   determining, by the electronic device, a network connection to the host computer system is unavailable;
   storing, by the electronic device, the instructions to complete the financial transaction at least until the network connection to the host computer system is available;
   after a period of time, polling, by the electronic device, the network connection to determine that the host computer system is available;
   transmitting, from the electronic device to the host computer system, the instructions to complete the financial transaction and a timestamp indicating when the set of financial data was received at the electronic device;
   receiving, at the host computer system, the instructions to complete the financial transaction and the timestamp;
   determining, at the host computer system, the financial transaction is eligible to be retroactively applied to the account;
   retroactively applying, at the host computer system, the financial transaction to the account with the financial transaction at a time linked to the timestamp; and
   adjusting, at the host computer system, a credit or debit of the account based on the account being retroactively adjusted by the financial transaction.

2. The method of claim 1, wherein the electronic device comprises a clock used to create the timestamp, and the method further comprising, prior to receiving the instructions to complete the financial transaction at the electronic device, while the network was previously available, synchronizing the clock with a time and a date received at the electronic device from the network.

3. The method of claim 1, wherein the period of time is greater than 1 day.

4. The method of claim 1, wherein:
   the electronic device is a computer system; and
   the network is comprised of the Internet.

5. The method of claim 1, wherein the electronic device is a mobile device.

6. The method of claim 5, wherein:
   the mobile device is a cellular phone; and
   the network is comprised of a cellular service provider's network.

7. The method of claim 1, further comprising:
   transmitting, from the host computer system to the electronic device, a confirmation indicating that funds have been retroactively credited to the account; and
   receiving, at the electronic device, the confirmation.

8. A non-transitory computer-readable medium of a host computer system comprising instructions, which, when executed by a processor, cause the processor to apply a financial transaction retroactively to an account, the instructions comprising instructions for:
   receiving, from a remote electronic device, a set of financial transaction data,
      wherein the set of financial transaction data was recorded at the electronic device when the electronic device was unable to communicate with the host computer system;
      wherein the financial data comprises an account identifier identifying an account, an amount of funds, and a timestamp indicating when the set of financial transaction data was received at the electronic device,
      determining, using the set of financial transaction data, that the financial transaction is eligible to be retroactively applied to the account;
   retroactively applying the financial transaction to the account; and
   adjusting a balance of the account at least partially based on the retroactively applied financial transaction.

9. The non-transitory computer-readable medium of claim 8, further comprising instructions for transmitting a confirmation to a customer linked to the account indicating that funds have been credited to the account retroactively.

10. The non-transitory computer-readable medium of claim 8, wherein, prior to receiving the set of financial transaction data, the remote electronic device was disconnected from a network and was thereby unable to communicate with the host computer system for a period of time.

11. The non-transitory computer-readable medium of claim 8, wherein at least a portion of the set of financial transaction data was received from a customer at the remote electronic device while the remote electronic device was disconnected from a network.

12. The non-transitory computer-readable medium of claim 11, wherein the period of time between when at least the portion of the set of financial transaction data was received from the customer at the remote electronic device and when the set of financial transaction data was received from the remote electronic device is greater than a day.

13. The non-transitory computer-readable medium of claim 8, wherein adjusting the balance of the account comprises eliminating a debit of an overdraft fee that is no longer applicable following the retroactive financial transaction.

14. The non-transitory computer-readable medium of claim 8, wherein adjusting the balance of the account comprises increasing an amount of interest credited to the account and the increased amount of interest comprises interest accrued on an increased amount of funds in the account following the retroactive financial transaction.

15. A system for retroactively applying a financial transaction to an account, the system comprising:
- a remote electronic device, wherein the remote electronic device is configured to:
- receive financial transaction information from a customer, wherein the financial transaction information includes an account number and an amount of funds;
- determine a host computer system is unavailable;
- store the set of financial data at least until the host computer system is available;
- periodically poll the network, until the host computer system is available via the network;
- transmit to the host computer system the financial transaction information and a timestamp indicating when the financial transaction information was received by the electronic device from the customer; and
- a banking host computer system, wherein the banking host computer system is configured to:
- receive the financial transaction information and the timestamp;
- determine the financial transaction is eligible to be retroactively applied to the account;
- retroactively apply the financial transaction to the account at a time linked to the timestamp; and
- adjust a balance of the account based on the retroactive financial transaction.

16. The system of claim 15, wherein the electronic device comprises a clock used to create the timestamp configured to synchronize the clock with a time and a date received at the electronic device from the network, wherein the synchronization occurs prior to receiving the financial transaction information at the electronic device during a time when the network was available.

17. The system of claim 15, wherein the adjustment of the balance of the account comprises eliminating a debit of an overdraft fee that is no longer applicable following the financial transaction being retroactively applied to the account.

18. The system of claim 15, wherein the adjustment of the balance of the account comprises increasing an amount of interest credited to the account and the increased amount of interest comprises interest accrued on funds linked to the retroactively applied financial transaction.

19. The system of claim 15, wherein:
the remote electronic device is a cellular phone; and
the network is comprised of a cellular service provider's network.

20. The system of claim 15, wherein:
the remote electronic device is a computer system; and
the network is comprised of the Internet.

* * * * *